United States Patent [19]
Enders et al.

[11] Patent Number: 5,810,390
[45] Date of Patent: Sep. 22, 1998

[54] MODULE CASE FOR SIDE IMPACT AIRBAG MODULE

[75] Inventors: Mark L. Enders; Timothy M. Martersteck, both of Ogden, Utah; Marc D. Folsom, Tokyo, Japan

[73] Assignee: Morton International, Inc., Chicago, Ill.

[21] Appl. No.: 760,663

[22] Filed: Dec. 9, 1996

[51] Int. Cl.$^6$ .................................................. B60R 21/22
[52] U.S. Cl. ................................ 280/730.2; 280/728.2; 280/743.1
[58] Field of Search ........................ 280/730.2, 728.3, 280/732, 728.2, 743.1

[56] References Cited

U.S. PATENT DOCUMENTS

| | | | |
|---|---|---|---|
| 5,069,477 | 12/1991 | Shiraki | 280/743 |
| 5,498,030 | 3/1996 | Hill et al. | 280/728.1 |
| 5,645,295 | 7/1997 | White, Jr. et al. | 280/730.2 |
| 5,700,028 | 12/1997 | Logan et al. | 280/728.2 |

Primary Examiner—Stephen M. Johnson
Attorney, Agent, or Firm—George W. Rauchfuss, Jr.

[57] ABSTRACT

An airbag module case for use with a side-impact airbag module also including an airbag cushion containing an inflator assembly having two mounting projections extending through the airbag cushion. The airbag module case includes a lower shell and an upper shell for substantially containing the airbag cushion and the inflator assembly. A tear seam hinge joins the lower shell to the upper shell and allows the upper and the lower shells to open and receive the airbag cushion and the inflator assembly, and to close with an inflator seat of the bottom shell receiving the inflator assembly and airbag cushion and an inflator closure of the upper shell overlapping the inflator seat of the lower shell. The two spaced-apart mounting studs of the inflator assembly extend through two spaced-apart mounting apertures of the inflator seat and through two spaced-apart mounting apertures of the inflator closure to secure the upper and the lower shells in a closed position containing the airbag cushion and the inflator assembly. The tear seam hinge is rupturable upon inflation of the folded airbag cushion within the closed and secured upper and lower shells and the module case opens along the tear seam hinge to release the inflating airbag cushion, with the upper and the lower shells remaining secured to the mounting projection.

8 Claims, 5 Drawing Sheets

MODULE CASE FOR SIDE IMPACT AIRBAG MODULE

FIELD OF THE INVENTION

The present invention relates to an airbag module and, more particularly, to an airbag module case for use with a side airbag module that mounts internally within a vehicle seat.

BACKGROUND OF THE INVENTION

An airbag module is part of an inflatable restraint system that is employed in a vehicle for protecting an occupant against injury by deploying an inflated airbag cushion to physically restrain the occupant when the vehicle encounters a collision. The airbag module normally includes an airbag cushion and an inflator that, once triggered by a remote collision sensor, provides the inflation gas for inflating the airbag cushion. As its name implies, a side airbag module protects an occupant against an impact to the side of the vehicle and is normally positioned somewhere between the occupant and a side of the vehicle closest to the occupant. One option for positioning a side airbag module which has proven advantageous is on or within the side of a seat back of a front seat, adjacent the center pillar of the vehicle. This position is advantageous because the airbag is kept in the optimum protective position, adjacent the occupant's upper body, as the seat back is adjusted.

Currently, many seat mounted side airbag modules are mounted internally within the seat behind the padding and the upholstery of the seat. Normally, the airbag module also includes a module cover or case containing and protecting the inflator and airbag cushion. Upon inflation of the airbag cushion, the inflating airbag cushion breaks through the module case and a seam of the seat upholstery into a fully inflated position.

Some existing module covers include a clam-shell type body for containing the airbag cushion and inflator assembly. The clam shell body has a hinge on one side and clips on an opposite side for holding the body closed. Upon inflation of the airbag cushion, the clips, as designed, become unattached and allow the module cover to open and release the inflating airbag cushion. However, because the hinge portion is relatively thin compared to the rest of the module cover in order to be bendable, the hinge portion, contrary to design, also acts as a tear seam. This unwanted tear seam causes half of the module cover to be disconnected from the airbag module during inflation of the airbag cushion when preferably the entire module cover should remain secured to the airbag module during deployment of the inflated airbag cushion.

There is a need therefore for an improved module cover for use with an internally mounted side airbag module. The improved module cover should open at generally only one side and separate into generally two parts. In addition, the improved module cover should have securing means for closing and securing the module cover that are easy to engage and that will secure the module cover to the airbag module during deployment of an inflated airbag cushion.

SUMMARY OF THE INVENTION

A general object, therefore, of the present invention is to provide an improved side airbag module.

A more specific object of the present invention is to provide an improved module case for use with a side airbag module.

Another object of the present invention is to provide an improved module case having a tear seam defined by a hinge portion of the module case, so that the module case will open at generally only one side and separate into generally two parts.

An additional object of the present invention is to provide an improved module case having means for closing and securing the module case that are easy to engage and that will secure the module case with the airbag module during deployment of an inflated airbag cushion.

A further object of the present invention is to provide an improved module case having securing means positioned generally opposite the hinge portion and tear seam of the module case so that the two parts of the module case formed upon the module case opening at the tear seam are both secured to the airbag module by the securing means.

In carrying out this invention, there is provided an airbag module case for substantially containing an airbag cushion and an inflator assembly as part of a side airbag module. The inflator assembly has an airbag inflator and at least one mounting projection extending therefrom, and the airbag inflator is in communication with the airbag cushion so that inflation gas produced by the inflator will inflate the airbag cushion.

The airbag module case includes an upper shell and a lower shell for substantially containing the airbag cushion and the inflator assembly. A tear seam hinge connects the upper shell to the lower shell and allows the upper and the lower shells to open about the tear seam hinge for receiving the airbag cushion and the inflator assembly and to close about the tear seam hinge for substantially containing the airbag cushion and the inflator assembly. Each of the upper and the lower shells is configured generally opposite the tear seam hinge to receive and engage the mounting projection of the inflator assembly so that the upper and lower shells of the module case are secured in a closed position with the airbag cushion and the inflator assembly substantially contained therebetween. The tear seam hinge ruptures upon initial inflation of the airbag cushion within the closed and secured upper and lower shells and the module case opens along the ruptured tear seam hinge to release the inflating airbag cushion, with the upper and the lower shells remaining secured to the mounting projection.

According to one aspect of the present invention, the lower shell includes a bottom wall with a hinge sidewall and an opposing mount sidewall extending from the bottom wall. The upper shell includes a top wall with a hinge sidewall and an opposing mount sidewall extending from the top wall. At least one bridge extends between the hinge sidewall of the lower shell and the hinge sidewall of the upper shell and defines the tear seam hinge. The bottom wall of the lower shell forms an inflator seat adjacent the mount sidewall defining at least one mounting aperture for receiving the at least one mounting projection extending from the inflator assembly. At least one inflator closure extends from the mount sidewall of the upper shell for extending over the at least one mounting aperture defined by the inflator seat of the lower shell. The at least one inflator closure also defines at least one mounting aperture for receiving the at least one mounting projection extending from the inflator assembly, thereby securing both the upper and the lower shells with the inflator assembly.

According to another aspect of the present invention, the lower shell includes a bottom wall with a hinge sidewall extending from the bottom wall. The bottom wall forms an inflator seat generally opposite the hinge sidewall, and the inflator seat defines at least one mounting aperture for receiving the at least one mounting projection extending from the inflator assembly. The upper shell includes a top wall with a mount sidewall extending from the top wall. At least one inflator closure extends from the mount sidewall for extending over the at least one mounting aperture defined by the inflator seat of the lower shell. The at least one inflator closure also defines at least one mounting aperture for receiving the at least one mounting projection extending from the inflator assembly, thereby securing both the upper and the lower shells with the inflator assembly. The tear seam hinge joins the hinge sidewall of the lower shell to the top wall of the upper shell generally opposite the mount sidewall.

The invention together with further objects, features, advantages and aspects thereof, will be more clearly understood from the following detailed description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
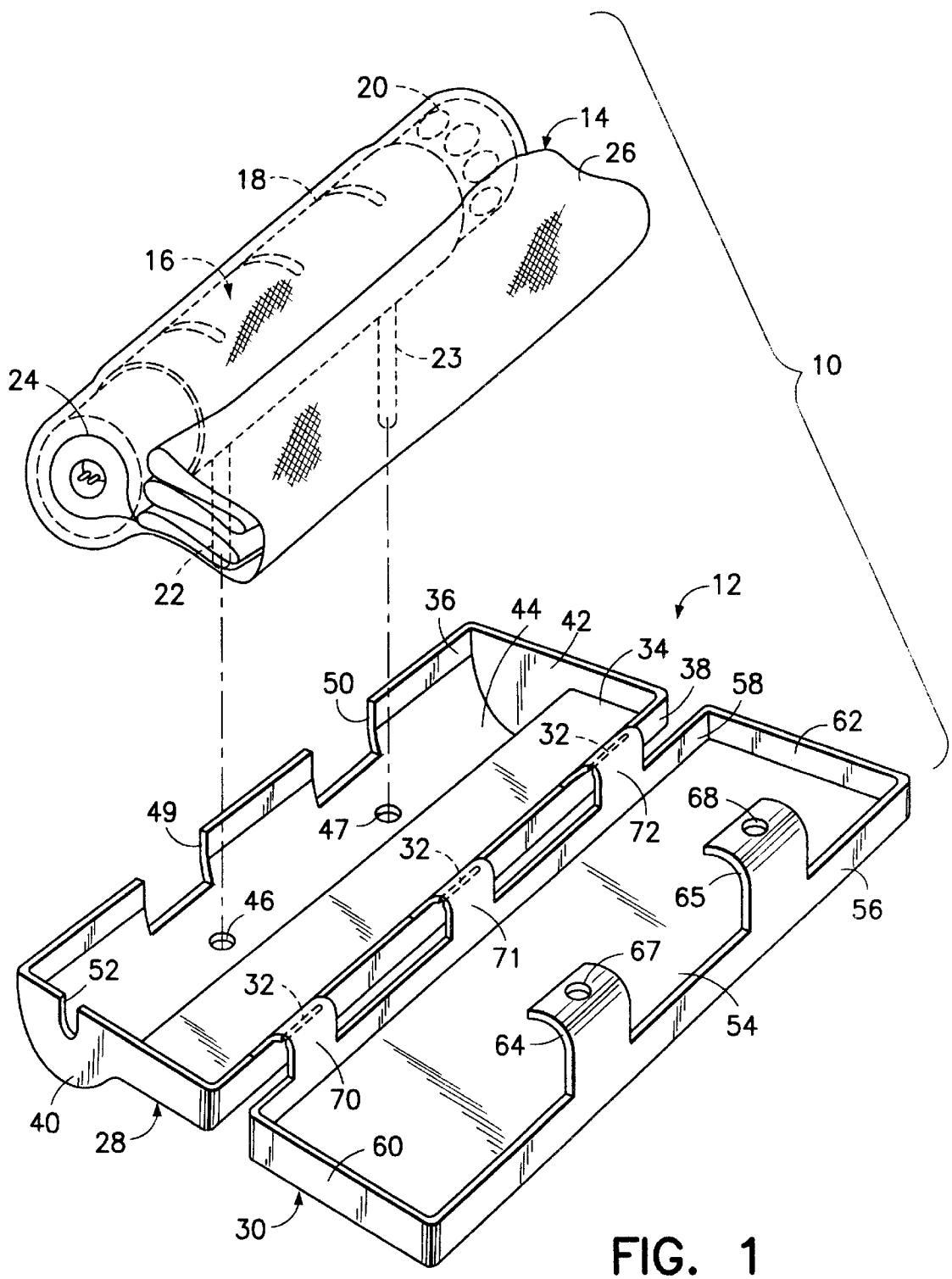
FIG. 1 is an exploded top perspective view of a side airbag module according to the present invention.

Referring to FIGS. 1 through 7, the present invention is directed to module cases 12,76 for use as part of side airbag modules 10,74 that mount internally within a motor vehicle seat (not shown). Each of the side airbag modules 10,74 also includes an inflatable airbag cushion 14 and an inflator assembly 16. The airbag cushion 14 and the inflator assembly 16 are generally known in the art and, therefore, only described in detail as relating to the present invention. The inflator assembly 16 includes a tubular inflator mounting sleeve 18 that tightly receives an elongated, cylindrical airbag inflator 20 and is crimped to secure the airbag inflator therein. Two mounting projections 22,23 in the form of threaded studs extend from the inflator mounting sleeve 18 for mounting the side airbag module 10 within a seat of a vehicle. It should be noted that a mounting projection can be provided in a form other than threaded studs, such as a flat elongated mounting flange for example, and the airbag module cases according to the present invention can be adapted for use with such a mounting projection without departing from the true scope and spirit of the invention. The inflator mounting sleeve 18 and the airbag inflator 20 secured therein are positioned within a mouth 24 of the airbag cushion 14 so that inflation gas from the airbag inflator will inflate the airbag cushion. The two threaded studs 22,23 extend through the mouth 24 of the airbag cushion 14. A main portion 26 of the airbag cushion 14 is folded and nestled against the inflator assembly 16.

Figure 2:
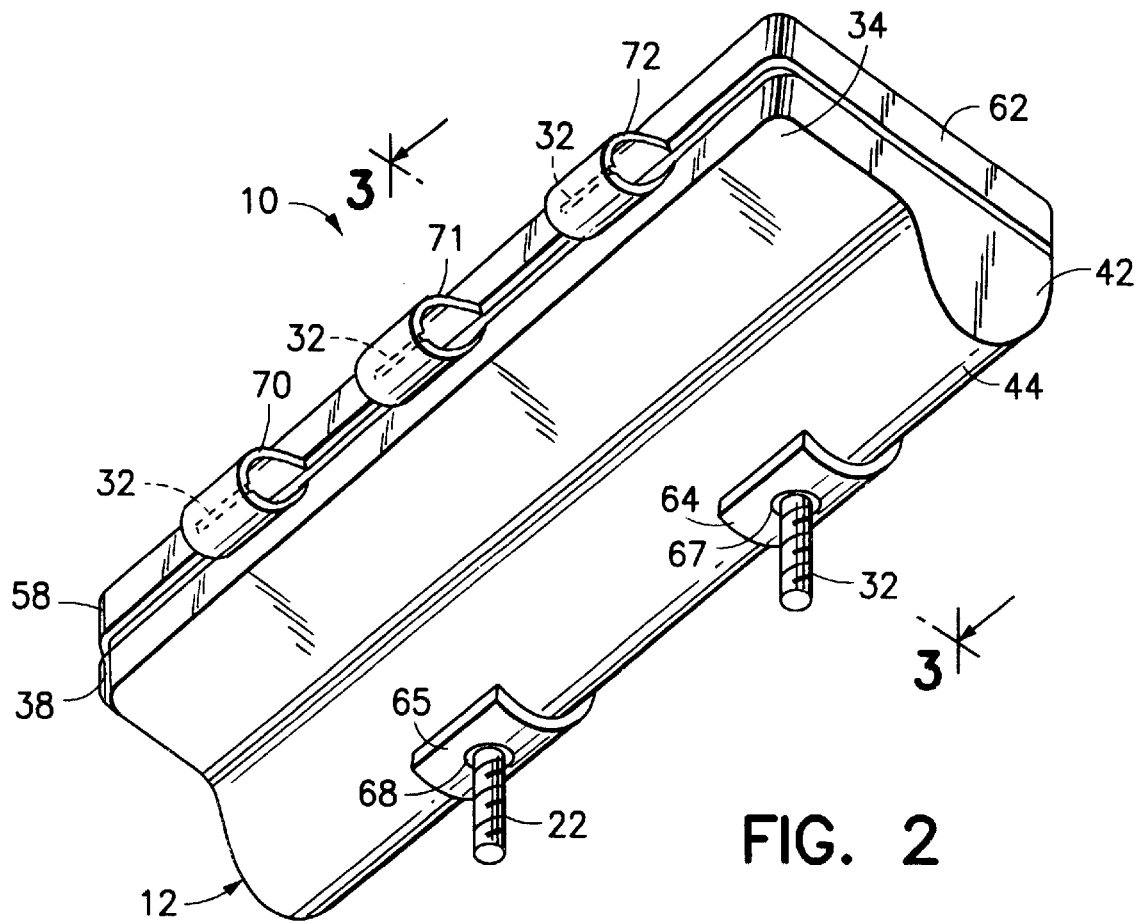
FIG. 2 is a bottom perspective view of the side airbag module of FIG. 1.
Figure 3:
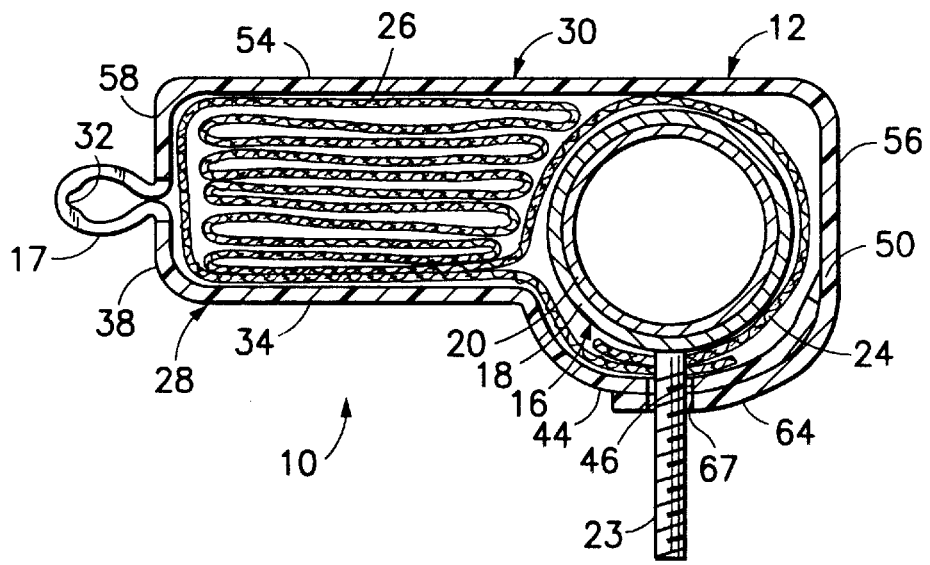
FIG. 3 is a sectional view of the side airbag module of FIGS. 1 and 2 taken along the line 3—3 of FIG. 2.

Referring first to FIGS. 1 through 3, the module case 12 is injection molded from a suitable thermoplastic elastomeric such as polyester or polypropylene. Other materials and molding techniques may also be used. The module case 12 includes a lower shell 28 and an upper shell 30 joined by a tear seam hinge 32. The lower shell 28 is generally rectangular and has a bottom wall 34, a mount sidewall 36 and an opposing hinge sidewall 38 extending from the bottom wall, and two opposed endwalls 40,42 extending from the bottom wall between the mount sidewall and the hinge sidewall. The bottom wall 34 defines an elongated semi-tubular inflator seat 44 adjacent the mount sidewall 36 and extending between the opposing endwalls 40,42 with the inflator seat defining two spaced-apart mounting apertures 46,47. Two spaced-apart cut-outs 49,50 in alignment with the two spaced-apart mounting apertures 46,47 are defined by the mount sidewall 36 and the inflator seat 44. The endwall 40 defines an inflator access slot 52.

The upper shell 30 of the module case 12 is also generally rectangular and has a top wall 54, a mount sidewall 56 and an opposing hinge sidewall 58 extending from the top wall, and two opposed endwalls 60,62 extending from the top wall between the mount sidewall and the hinge sidewall. Two spaced-apart inflator closures 64,65 extend from the mount sidewall 56 with each inflator closure defining a mounting aperture 67,68.

The upper shell 30 is connected to the lower shell 28 by three spaced-apart bridges 70,71,72 extending between the hinge sidewall 38 of the lower shell to the hinge sidewall 58 of the upper shell, and each of the three spaced-apart bridges defines the tear seam hinge 32. The tear seam hinge 32 is a centrally located, relatively thin portion of each bridge 70,71,72. The relative thinness of the tear seam hinge 32 provides flexibility, and also rupturability upon a force produced by an inflating airbag cushion.

As shown in FIG. 1, the flexible tear seam hinge 32 allows the upper and the lower shells 30,28 to open about the tear seam hinge, with the inflator seat 44 of the bottom wall 34 of the lower shell receiving the inflator assembly 16 and the surrounding mouth 24 of the airbag cushion 14. The two spaced-apart mounting studs 22,23 of the inflator assembly 16 extend through the two spaced-apart mounting apertures 46,47 of the inflator seat 44, and the lower shell 28 between the inflator seat and the three spaced-apart bridges 70,71,72 receives the folded portion 26 of the airbag cushion 14.

Referring to FIG. 2, the flexible tear seam hinge 32 then allows the upper shell 30 to close about the tear seam hinge over the inflator assembly 16 and the airbag cushion 14, with the two inflator closures 64,65 of the upper shell overlapping the two mounting apertures 46,47 of the inflator seat 44 of the lower shell 28 and receiving the two spaced-apart mounting studs 22,23 of the inflator sleeve 18 through their respective mounting apertures 67,68. The two spaced-apart cut-outs 49,50 of the lower shell 28 allow the two spaced-apart inflator closures 64,65 to more easily overlap the inflator seat 44. The upper and the lower shells 30,28 are thereby secured in a closed position containing the airbag cushion 14 and the inflator assembly 16, and the side airbag module 10 is ready to be mounted within a vehicle seat.

Upon initiation of the airbag inflator 20, due to a vehicle collision for example, the airbag inflator creates a volume of inflation gas which inflates the folded portion 26 of the airbag cushion 14 positioned adjacent the rupturable tear seam hinge 32 of the module case 12. The inflating airbag cushion 14 ruptures the tear seam hinge 32 and splits the three spaced-apart bridges 70,71,72 connecting the upper shell 30 to the lower shell 28. The module case 12 then opens along the ruptured tear seam hinge 32 to deploy the inflating airbag cushion 14. The upper and the lower shells 30,28, meanwhile, remain secured to the two mounting studs 22,23 passing through the two spaced-apart mounting apertures 46,47 of the inflator seat 44 of the lower shell and the mounting apertures 67,68 of the two spaced-apart inflator closures 64,65 of the upper shell.

Referring to FIGS. 4 through 8, another module case 76 according to the present invention is blow molded from a suitable thermoplastic elastomeric such as polypropylene. The module case 76 is generally rectangular and includes a lower shell 78 and an upper shell 80 joined by a tear seam hinge 82. FIGS. 4 through 7 show bottom The lower shell 78 has a bottom wall 84 and a hinge sidewall 86 extending from the bottom wall, and the bottom wall defines an elongated, semi-tubular inflator seat 88 defining two spaced-apart mounting apertures 90,91. The upper shell 80 has a top wall 93, a mount sidewall 95 extending from the top wall and an elongated, semi-tubular inflator closure 97 extending from the mount sidewall and defining two spaced-apart mounting apertures 98,99.

The tear seam hinge 82 joins the hinge sidewall 86 of the lower shell 78 to the top wall 93 of the upper shell 80 opposite the inflator closure 97. The tear seam hinge 82 is relatively thin compared to the hinge sidewall 86 and the top wall 93. The relative thinness of the tear seam hinge 82 provides flexibility and rupturability upon a force produced by an inflating airbag cushion. The module case 76 forms an open end 100 defined between the top wall 93, the mount sidewall 95 and the elongated inflator closure 97 of the upper shell 80 and the inflator seat 88, the bottom wall 84 and the hinge sidewall 86 of the lower shell 78. The module case 76 also includes an endwall 102 joining the bottom wall 84 and the hinge sidewall 86 of the lower shell 78 to the top wall 93 and the mount sidewall 95 of the upper shell 80 opposite the open end 100, with the inflator seat 88 and the inflator closure 97 spaced-apart from the endwall. A semi-tubular inflator endcap 104 is formed by the bottom wall 84 of the lower shell 78 extending from the endwall 102 to adjacent the inflator seat 88, and extending to the mount sidewall 95 of the upper shell 80 between the endwall and the inflator closure 97.

Figure 4:
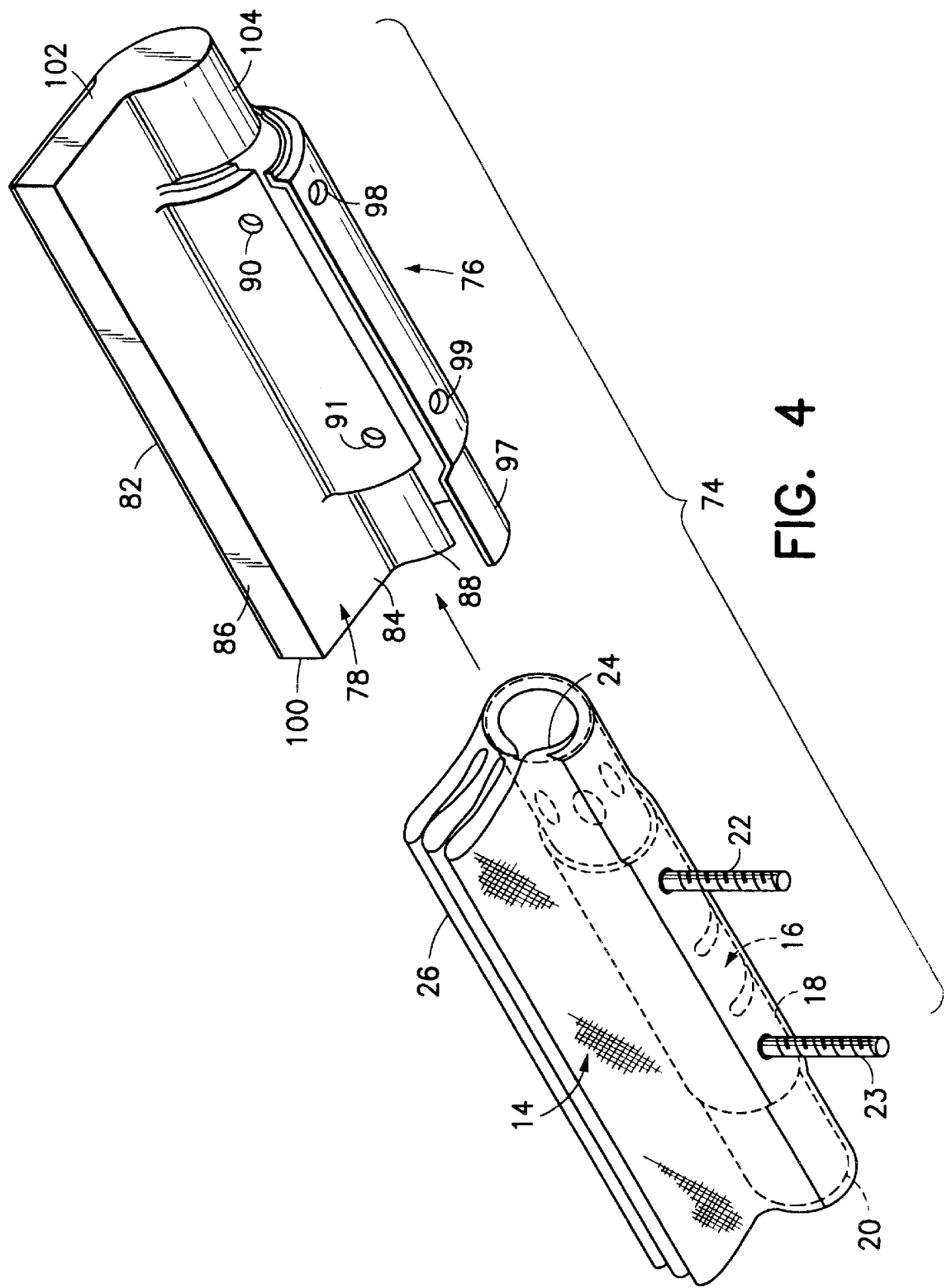
FIG. 4 is an exploded bottom perspective view of a side airbag module according to the present invention.
Figure 5:
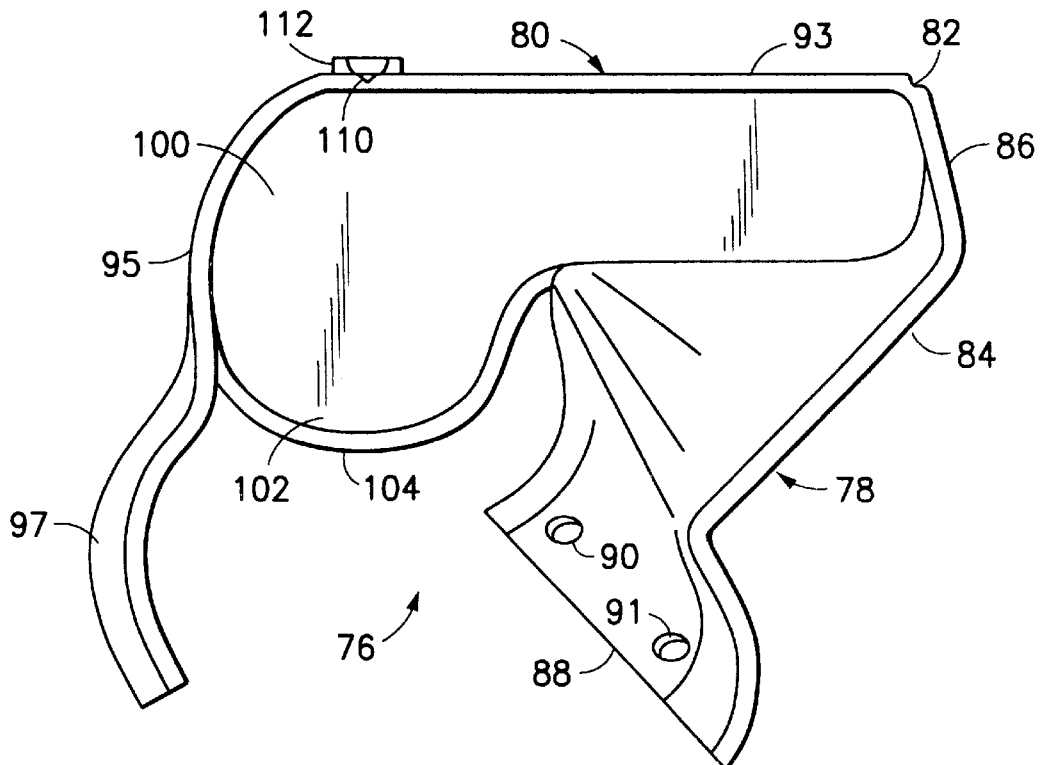
FIG. 5 is an end view of a module case of the side airbag module of FIG. 4.
Figure 6:
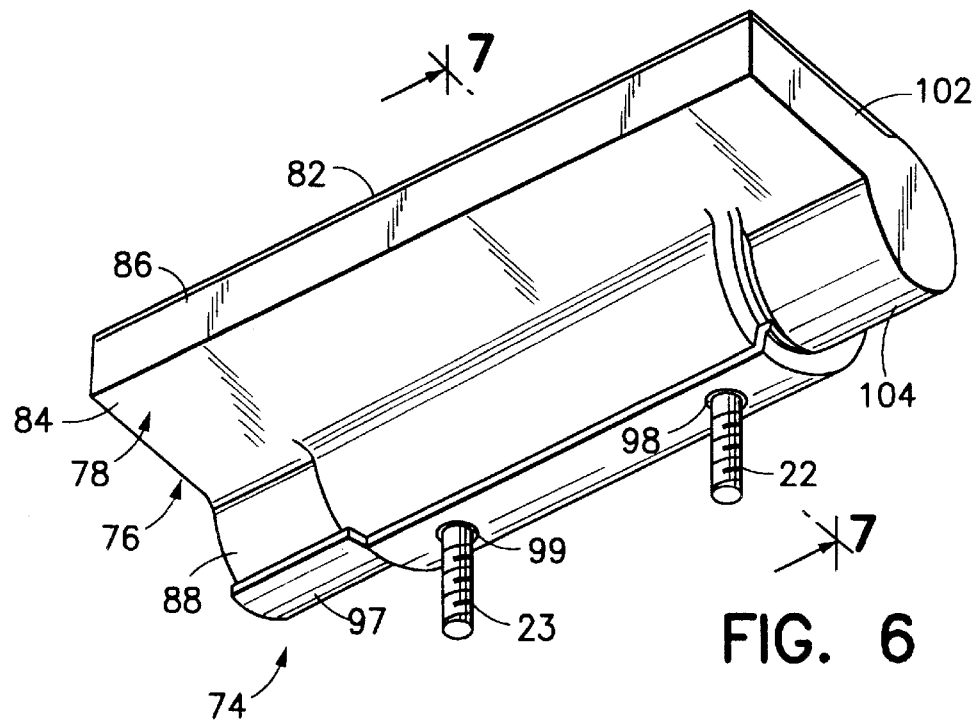
FIG. 6 is a bottom perspective view of the side airbag module of FIG. 4.
Figure 7:
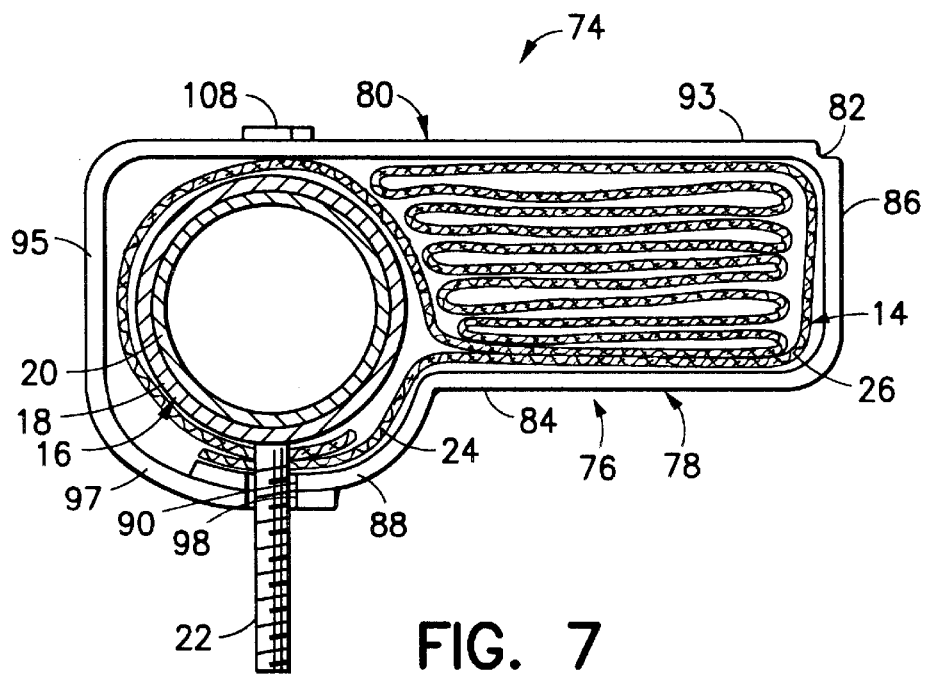
FIG. 7 is a sectional view of the side airbag module of FIGS. 4 and 6 taken along the line 7—7 of FIG. 6.

As shown in FIGS. 4 and 5, the flexible tear seam hinge 82 allows the upper and the lower shells 80,78 to open about the tear seam hinge so that the airbag cushion 14 and the inflator assembly 16 can be inserted through the open end 100 of the module case 76. The inflator seat 88 of the lower shell 78 receives the inflator assembly 16 and the mouth 24 of the airbag cushion 14. As shown in FIGS. 6 and 7, the tear seam hinge 82 then allows the upper and the lower shells 80,78 to close about the tear seam hinge with the top wall 93 of the upper shell and the hinge sidewall 86 and the bottom wall 84 of the lower shell containing the folded portion 26 of the airbag cushion 14 adjacent the tear seam hinge. The elongated inflator closure 97 of the upper shell 80 overlaps the two mounting apertures 90,91 of the inflator seat 88 of the lower shell 78, and the two spaced-apart mounting studs 22,23 of the inflator assembly 16 extend through the two spaced-apart mounting apertures of the inflator seat and through the two spaced-apart mounting apertures 98,99 of the elongated inflator closure. The upper and the lower shells 80,78 are then secured in a closed position containing the airbag cushion 14 and the inflator assembly 16, and the side airbag module 74 is ready to be mounted within a vehicle seat. It should be noted that the module case 76 can further include a suitable cover for closing the open end 100 of the module case, if desired.

Figure 8:
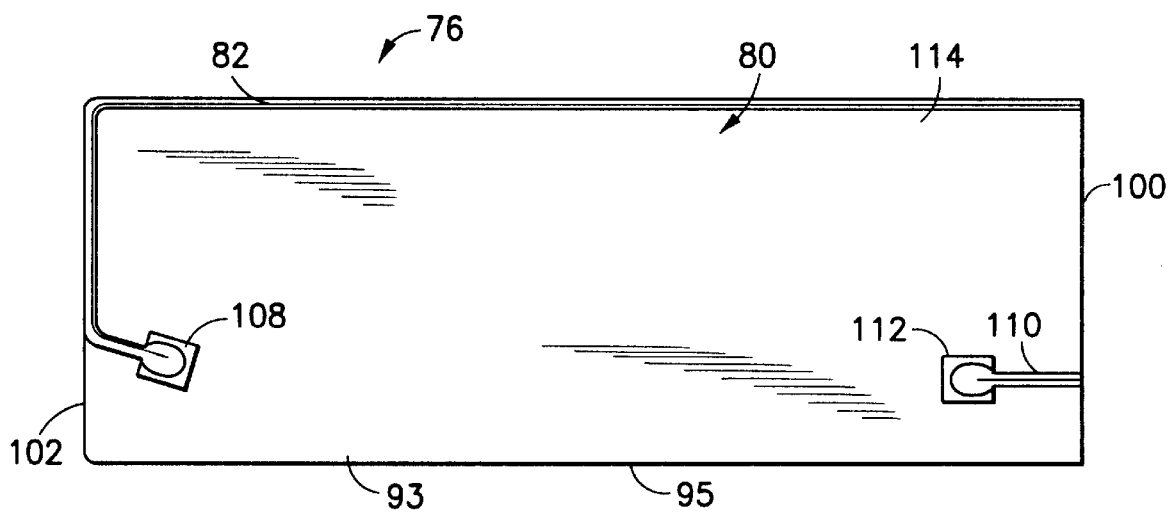
FIG. 8 is a top plan view of the side airbag module.

As shown best in FIG. 8, the tear seam hinge 82 extends from the open end 100 of the module case 76 to the endwall 102. The tear seam hinge 82 then turns and further extends between the top wall 93 and the endwall 102, and then turns again and extends to a first block 108 defined by the top wall. As shown in FIG. 7, the first block 108 has a thickness that is greater than the thickness of the top wall 93. A second tear seam 110 is defined by the top wall 93 and extends inwardly from the open end 100 to a second block 112 defined by the top wall. As shown in FIG. 5, the second block 112 of material also has a thickness that is greater than the thickness of the top wall 93. The tear seam hinge 82 and the second tear seam 110 define a deployment door portion 114 of the top wall 93.

Upon initiation of the airbag inflator 20, due to a vehicle collision for example, the airbag inflator creates a volume of inflation gas which inflates the folded portion 26 of the airbag cushion 14 positioned adjacent the rupturable tear seam hinge 82 of the module case 76. The inflating airbag cushion 14 ruptures the tear seam hinge 82 and the second tear seam 110 so that the deployment door portion 114 opens to deploy the inflating airbag cushion 14. The first and the second blocks 108,112 defined by the top wall 93 prevent a tear formed in the tear seam hinge 82 and the second tear seam 110 from spreading across the top wall of the upper shell 80 to sever the deployment door portion 114 from the module case 76. The upper and the lower shells 78,80, meanwhile, remain secured to the two mounting studs 22,23 passing through the two spaced-apart mounting apertures 90,91 of the inflator seat 88 of the lower shell and the mounting apertures 98,99 of the elongated inflator closure 97 of the upper shell.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag module case for substantially containing an inflatable airbag cushion and an inflator assembly as part of a side airbag module, the inflator assembly having an airbag inflator and at least one mounting projection extending from the inflator assembly, the inflatable airbag cushion having a mouth containing the inflator assembly so that inflation gas produced by the inflator will inflate the airbag cushion, with the at least one mounting projection of the inflator assembly extending through the airbag cushion, a portion of the inflatable airbag cushion folded and nestled against the inflator assembly, the airbag module case comprising:

an upper shell and a lower shell for substantially containing the airbag cushion and the inflator assembly, the lower shell includes a bottom wall, and a hinge sidewall and an opposing mount sidewall extending from the bottom wall; the upper shell includes a top wall, and a hinge sidewall and an opposing mount sidewall extending from the top wall; and a tear seam hinge connects the hinge sidewall of the lower shell to the hinge sidewall of the upper shell;

at least one bridge extends between the hinge sidewall of the lower shell and the hinge sidewall of the upper shell and defines the tear seam hinge connecting the upper shell to the lower shell and allowing the upper and the lower shell to open about the tear seam hinge for receiving the airbag cushion and the inflator assembly and to close about the tear seam hinge for substantially containing the airbag cushion and the inflator assembly; and each of the upper and the lower shells configured with at least one mounting aperture generally opposite the tear seam hinge to receive and engage the at least one mounting projection of the inflator assembly, thereby securing the upper and lower shells in a closed position with the airbag cushion and the inflator assembly substantially contained therebetween and for securing each of the upper and the lower shells to the at least one mounting projection and wherein the at least one mounting aperture of the lower shell is defined by the bottom wall adjacent the mount sidewall and the upper shell is configured with at least one inflator closure extending from the mount sidewall of the upper shell for extending over the at least one mounting aperture defined by the lower shell, the at least one inflator closure defining the at least one mounting aperture of the upper shell;

wherein the bottom wall of the lower shell forms an elongated inflator seat adjacent the mount sidewall for receiving the inflator assembly and the mouth of the inflatable airbag cushion, with the inflator seat defining the at least one mounting aperture of the lower shell, the bottom wall between the inflator seat and the hinge sidewall for receiving the folded portion of the inflatable airbag cushion;

whereby the tear seam hinge ruptures upon inflation of the airbag cushion within the closed and secured upper and lower shells and the module case opens along the tear seam hinge to release the inflating airbag cushion, with the upper and the lower shells remaining secured to the mounting projection.

2. An airbag module case according to claim 1 wherein at least one bridge extends from the lower shell to the upper shell and defines the tear seam hinge.

3. An airbag module case according to claim 2 wherein the at least one bridge is in the form of three spaced-apart bridges, with each bridge defining the tear seam hinge.

4. An airbag module case according to claim 1 for substantially containing said airbag cushion and said inflator assembly wherein the at least one mounting projection extending from the inflator assembly is two spaced-apart studs and wherein:

the at least one mounting aperture defined by the inflator seat of the lower shell being two spaced-apart mounting apertures; and the at least one inflator closure extending from the mount sidewall of the upper shell being two spaced-apart inflator closures, with the at least one mounting aperture defined by each inflator closure being one mounting aperture.

5. An airbag module comprising:

A) an inflator assembly including an inflator and at least two spaced-apart mounting studs extending therefrom;

B) an inflatable airbag cushion having a mouth containing the inflator assembly so that inflation gas produced by the inflator will inflate the airbag cushion, with the at least two spaced-apart mounting studs of the inflator assembly extending through the airbag cushion, a portion of the inflatable airbag cushion folded and nestled against the inflator assembly; and C) a module case for substantially containing the airbag cushion and the inflator assembly, the airbag module case including, 1) a lower shell having a bottom wall, a hinge sidewall extending generally perpendicular from the bottom wall, the bottom wall forming an elongated inflator seat, the inflator seat defining at least two spaced-apart mounting apertures, 2) an upper shell having a top wall, a mount sidewall extending from the top wall and an elongated inflator closure extending from the mount sidewall, the elongated inflator closure defining at least two spaced-apart mounting apertures, 3) a tear seam hinge joining the hinge sidewall of the lower shell to the top wall of the upper shell generally opposite the mount sidewall, the tear seam hinge allowing the upper and the lower shells to open about the tear seam hinge and receive the airbag cushion and the inflator assembly through an open end defined between the top wall, the mount sidewall and the elongated inflator closure of the upper shell and the inflator seat, the bottom wall and the hinge sidewall of the lower shell, 4) the tear seam hinge allowing the upper and the lower shells to close about the tear seam hinge with the top wall of the upper shell and the hinge sidewall and the bottom wall of the lower shell containing the folded portion of the airbag cushion adjacent the tear seam hinge, and the inflator seat of the bottom shell receiving the inflator assembly and the airbag cushion mouth, with the elongated inflator closure of the upper shell overlapping the at least two mounting apertures of the inflator seat of the lower shell, and the at least two spaced-apart mounting studs of the inflator assembly extending through the at least two spaced-apart mounting apertures of the inflator seat and through the at least two spaced-apart mounting apertures of the elongated inflator closure, securing the upper and the lower shells in a closed position containing the airbag cushion and the inflator assembly, the tear seam hinge rupturable upon inflation of the folded airbag cushion within the closed and secured upper and lower shells, and 5) an endwall joining the bottom wall and the hinge sidewall of the lower shell to the top wall and the mount sidewall of the upper shell opposite the open end, with the inflator seat and the inflator closure spaced-apart from the endwall, an inflator endcap formed by the bottom wall of the lower shell extending from the endwall to adjacent the inflator seat, and extending to the mount sidewall of the upper shell between the endwall and the inflator closure.

6. An airbag module comprising:

A) an inflator assembly including an inflator and at least two spaced-apart mounting studs extending from the inflator assembly;

B) an inflatable airbag cushion having a mouth containing the inflator assembly so that inflation gas produced by the inflator will inflate the airbag cushion, with the at least two spaced-apart mounting studs of the inflator assembly extending through the airbag cushion, a portion of the inflatable airbag cushion folded and nestled against the inflator assembly; and C) a module case for substantially containing the airbag cushion and the inflator assembly, the airbag module case including, 1) a generally rectangular lower shell forming a bottom wall, a mount sidewall and an opposing hinge sidewall extending from the bottom wall, and two opposed endwalls extending from the bottom wall between the mount sidewall and the hinge sidewall, the bottom wall defining an elongated inflator seat adjacent the mount sidewall and extending between the opposing endwalls with the inflator seat defining at least two spaced-apart mounting apertures, 2) a generally rectangular upper shell forming a top wall, an mount sidewall and an opposing hinge sidewall extending from the top wall, and two opposed endwalls extending from the top wall between the mount sidewall and the hinge sidewall, at least two spaced-apart narrow inflator closures extending from the mount sidewall with each narrow inflator closure defining a mounting aperture, and 3) three spaced-apart bridges extending between the hinge sidewall of the lower shell to the hinge sidewall of the upper shell, with the three spaced-apart bridges defining a tear seam hinge allowing the upper and the lower shells to open about the tear seam hinge, with the inflator seat of the bottom wall of the lower shell receiving the inflator assembly and the airbag cushion mouth, with the at least two spaced-apart mounting studs of the inflator assembly extending through the at least two spaced-apart mounting apertures of the inflator seat, and the lower shell between the inflator seat and the three spaced-apart bridges receiving the folded portion of the airbag cushion, 4) the tear seam hinge allowing the upper shell to close about the tear seam hinge over the inflator assembly and the airbag cushion, with the at least two inflator closures of the upper shell overlapping the at least two mounting apertures of the inflator seat of the lower shell and receiving the at least two spaced-apart mounting studs of the inflator through their respective mounting apertures, securing the upper and the lower shells in a closed position containing the airbag cushion and the inflator assembly, the tear seam hinge rupturable upon inflation of the folded airbag cushion within the closed and secured upper and lower shells.

7. An airbag module case for substantially containing an inflatable airbag cushion and an inflator assembly as part of a side airbag module, the inflator assembly having an airbag inflator and at least one mounting projection extending from the inflator assembly, the inflatable airbag cushion having a mouth containing the inflator assembly so that inflation gas produced by the inflator will inflate the airbag cushion, with the at least one mounting projection of the inflator assembly extending through the airbag cushion, a portion of the inflatable airbag cushion folded and nestled against the inflator assembly, the airbag module case comprising:

an upper shell and a lower shell for substantially containing the airbag cushion and the inflator assembly; the lower shell includes a bottom wall and a hinge sidewall extending from the bottom wall; the upper shell includes a top wall, and a mount sidewall extending from the top wall;

a tear seam hinge connecting the top wall of the upper shell generally opposite the mount sidewall to the hinge sidewall of the lower shell and allowing the upper and the lower shell to open about the tear seam hinge for receiving the airbag cushion and the inflator assembly and to close about the tear seam hinge for substantially containing the airbag cushion and the inflator assembly; and each of the upper and the lower shells configured generally opposite the tear seam hinge to receive and engage the mounting projection of the inflator assembly, thereby securing the upper and lower shells in a closed position with the airbag cushion and the inflator assembly substantially contained therebetween and for securing each of the upper and the lower shells to the at least one mounting projection and wherein the at least one mounting aperture of the lower shell is defined by the bottom wall adjacent the mount sidewall and the upper shell is configured with at least one inflator closure extending from the mount sidewall of the upper shell for extending over the at least one mounting aperture defined by the lower shell, the at least one inflator closure defining the least one mounting aperture;

wherein the lower shell includes an elongated inflator seat extending from the bottom wall generally opposite the hinge sidewall for receiving the inflator assembly and the mouth of the inflatable airbag cushion, with the inflator seat defining the at least one mounting aperture of the lower shell, the bottom wall between the inflator seat and the hinge sidewall for receiving the folded portion of the inflatable airbag cushion; and whereby the tear seam hinge ruptures upon inflation of the airbag cushion within the closed and secured upper and lower shells and the module case opens along the tear seam hinge to release the inflating airbag cushion, with the upper and the lower shells remaining secured to the mounting projection.

8. An airbag module case according to claim 7 for substantially containing said airbag cushion and said inflator assembly wherein the at least one mounting projection extending from the inflator assembly is two spaced-apart studs and wherein:

the at least one mounting aperture defined by the inflator seat of the lower shell being two spaced-apart mounting apertures; and the at least one inflator closure extending from the mount sidewall of the upper shell being an elongated inflator closure, with the at least one mounting aperture defined by the elongated inflator closure being two spaced-apart mounting apertures.

* * * * *